Nov. 15, 1932.   A. CHURCHWARD   1,887,496
WELDING APPARATUS
Filed April 17, 1930
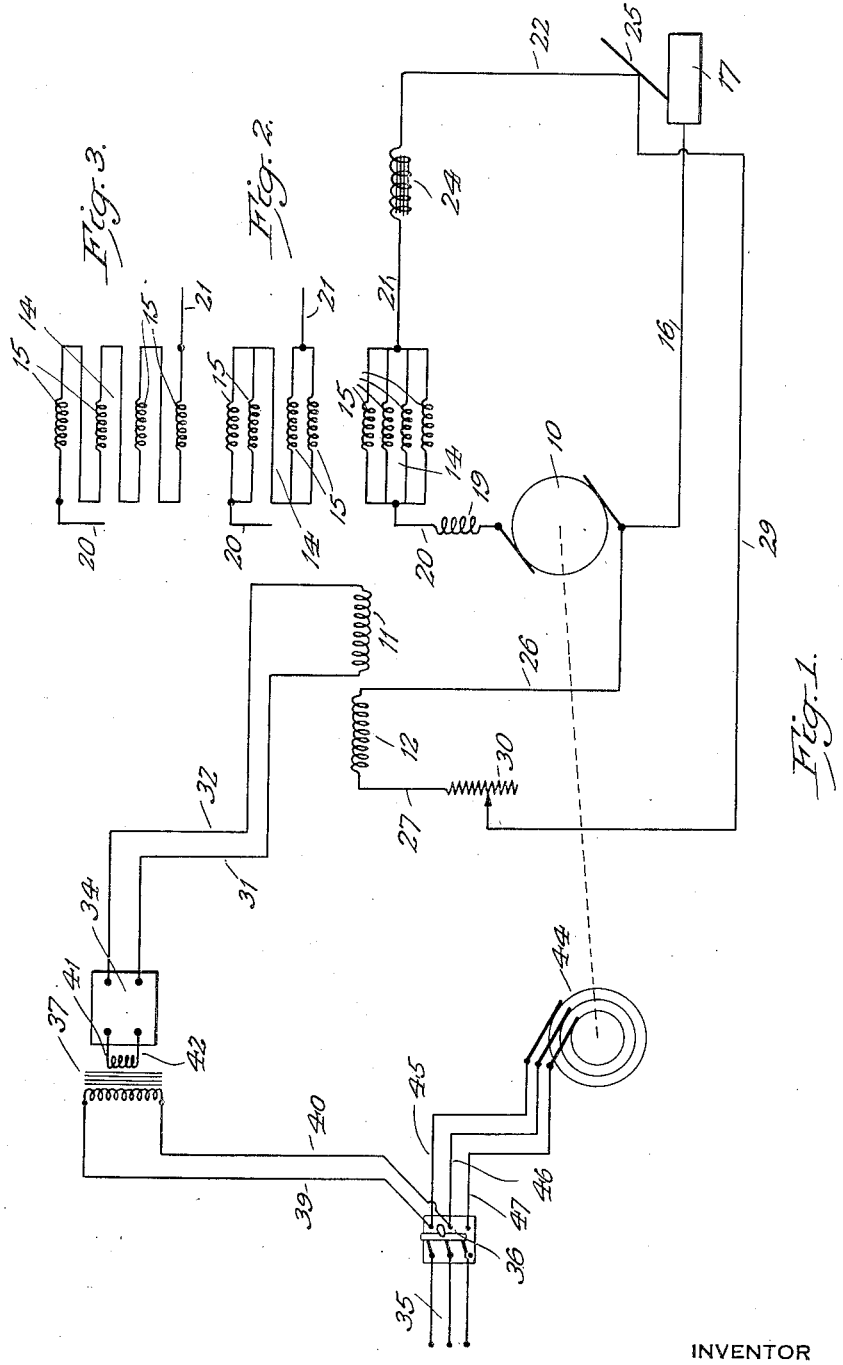
INVENTOR
Alexander Churchward
BY
Williams Rich & Morse
ATTORNEY Patented Nov. 15, 1932

1,887,496

UNITED STATES PATENT OFFICE

ALEXANDER CHURCHWARD, OF NEW YORK, N. Y., ASSIGNOR TO WILSON WELDER & METALS COMPANY, INC., OF HOBOKEN, NEW JERSEY, A CORPORATION OF NEW YORK

WELDING APPARATUS

Application filed April 17, 1930. Serial No. 444,920.

The present invention relates to arc welding apparatus and more particularly to such apparatus employing a direct current welding generator equipped with separately excited and bucking series fields.

In an apparatus of the character mentioned, a generator as an exciter is usually provided to supply current to the separately excited field windings of the welding generator. When operating such apparatus, such disturbances as reversal or breakdown of current in the exciter circuit, which includes the separately excited field windings, and in the welding circuit, which includes the bucking series field windings, very often take effect by reason of undue inductive reaction between the separately excited field windings and the bucking series field windings.

The general object of the invention is to provide a welding apparatus employing a direct current welding generator having separately excited and bucking series fields, which apparatus is compact, low in cost of manufacture, and efficient in that it involves minimum operating losses including the power required for proper excitation of the welding generator and effectively prevents harmful effects of undue inductive reaction between the separately excited field windings and the bucking series field windings of the welding generator.

The invention will be understood with the aid of the following description taken in connection with the accompanying drawing in which Fig. 1 illustrates an embodiment of the invention and shows four bucking series field windings connected in parallel in the welding circuit; Fig. 2 shows said bucking series field windings connected in series-parallel arrangement; and Fig. 3 shows said bucking series field windings connected in series arrangement.

In the embodiment of the invention shown in the drawing, a welding generator is equipped with separately excited field windings to which current is supplied from an alternating current source through a rectifying device which permits passage of current through said windings in only one direction. Said generator is also equipped with additional field windings which are excited from the generated voltage so that the voltage across said additional windings varies as the voltage across the work and electrode cooperating therewith. By this arrangement a very small rectifying device supplying the unidirectional current to the separately excited field windings can be used, thereby rendering the welding apparatus compact, comparatively low in cost of manufacture and reducing to a large extent the total power involved in supplying the proper excitation of the generator. The apparatus is free of all harmful effects which would otherwise occur by reason of undue inductive reaction between the separately excited field windings and the bucking series field windings.

The welding generator is preferably equipped with a plurality of bucking series field windings adapted to be connected in parallel, series-parallel and series arrangements, as described and claimed in my pending United Statess patent application Serial No. 419,268, filed January 8, 1930. A purpose of these parallel, series-parallel and series arrangements of the bucking series field windings is to obtain a variation of the welding current in the welding circuit, which variation is efficient in that it involves minimum resistance losses.

Fig. 1 illustrates a welding generator having an armature 10, separately excited field windings 11, and self-excited field windings 12, the fields produced by said windings 11 and 12 acting cumulatively with relation to one another. The welding generator is also equipped with a bucking series field 14 comprising a plurality of windings 15, four being shown in the drawings. One brush of the welding generator is connected by a conductor 16 to the work 17. The other brush of the welding generator is connected through the usual interpole windings 19 by a conductor 20 to one side of the bucking series field 14, the other side of which is connected by conductors 21 and 22 through the usual reactance unit 24 to the electrode 25 on the work 17. One side of the self-excited field windings 12 is connected by a conductor 26 to the brush of the generator in electrical connection with the work 17, and the other side of said windings 12 is connected by the conductors 27 and 29 through the variable resistance 30 to the electrode 25. Thus, the current taken by the windings 12 is determined by the voltage across the work 17 and welding electrode 25, and this current may be adjusted by the variable resistance 30.

The separately excited field windings 11 are connected to a source of current through a rectifying device, and, in the embodiment of the invention shown in the drawings, the source, indicated by the numeral 35, is a 3-phase alternating current source, and the rectifying device includes a rectifier unit 34 and a step-down transformer 37. The primary of the step-down transformer 37 is connected by conductors 39 and 40 to two output terminals of the control switch 36, the three input terminals of which are connected to said source 35. The secondary of the step-down transformer 37 is connected by conductors 41 and 42 to the input terminals of the rectifier unit 34 and the ouput terminals of the latter are conneced by conductors 31 and 32 to the separately excited field windings 11. The terminals of a 3-phase motor 44, which drives the welding generator and which may be mounted on the same shaft therewith, are connected by conductors 45, 46 and 47 to the output terminals of the switch 36, so that the latter controls both the operation of the motor 44 and the excitation of the windings 11.

In the embodiment of the invention shown in the drawing, three selected welding current values may be obtained by three possible combinations of interconnection of the four bucking series field windings 15, manually operated switching means (not shown) being used for effecting the change in connections. Thus, in Fig. 1, the four windings 15 are all connected in parallel, and by this arrangement the generator will deliver its maximum welding current output; in Fig. 2, two pairs of windings 15 each connected in parallel are connected in series with the welding circuit, and by this arrangement the generator will deliver approximately one-half of its maximum output; and in Fig. 3, the four windings 15 are all connected in series with one another and with the welding circuit, and by this arrangement the generator will deliver approximately one-quarter of its maximum output.

From the above description, it is apparent that a unidirectional current is supplied to the separately excited field windings 11 from the rectifier unit 34 and that said windings are always of the same polarity, since the rectifier unit 34 checks flow of current opposite to said unidirectional current.

When operating a welding apparatus employing a welding generator equipped with separately excited and bucking series fields and a generator as an exciter for supplying current to the separately excited field windings, harmful effects of inductive reaction between the separately excited field windings and the bucking series field windings, such as breakdown or reversal of current in the welding circuit, as well as in the circuit of the separately excited field windings, may be attributed to several causes, as, for example, a sudden throwing on of the current in the welding circuit with the welding electrode and a return conductor short circuited. By preventing reversal of current in the circuit of the separately excited field windings 11, the apparatus described herein is evidently totally free of all harmful effects of inductive reaction between the separately excited field windings and the bucking series field windings.

By making use of self-excited field windings 12, a rectifying device of very small size and capacity, including the unit 34 and the transformer 37 is made possible. This may be understood by observing, first, that the separately excited field windings 11 may be so designed as to provide a very small part of the open-circuit voltage of the generator, the other part being provided by the self-excited field windings 12. When welding, the magnetic flux through the magnetic field structure of the welding generator is greatly decreased by reason of the self-excited field and the bucking series field acting to lower the generator voltage from open-circuit to welding conditions. Thus, the magnetic condition of said field structure is very much improved; i. e., its permeability is very much increased from open-circuit to welding conditions. Consequently, the small power, required to produce the aforesaid small part of the open circuit voltage of the generator, is sufficient, when welding, to produce a large portion of the generator voltage, this making possible a rectifying device of comparatively small size and capacity. As an example, assuming an open-circuit voltage of 60 and a full load welding current of 300 amperes as the requirements of a welding generator, the total power, which would be required to properly excite a separately excited field alone providing the total open-circuit voltage of such generator, would be large, approximately 330 watts, due to saturation of the magnetic field structure of such generator upon open-circuit conditions. By making use of the self-excited field windings 12, the separately excited field windings 11 only need to provide a very small part of the total open-circuit voltage of 60, the remaining part being provided by the self-excited field windings 12. The power and hence the capacity of the rectifying device needed to properly excite the windings 11 to produce this small part of the open-circuit voltage may thus be small, say 30 watts; but the ampere-turns in the self-excited field windings 12 required to provide the remaining part of the generator open-circuit voltage of 60 are then necessarily great, this power being 300 watts, i. e., the difference between the 330 watts required to properly excite a separately excited field if used alone to produce the total open-circuit voltage of 60 and the 30 watts required to excite the separately excited field windings 11 when using the self-excited-field windings 12. The voltage across the self-excited-field windings 12 is lowered from open-circuit to welding conditions; i. e., from 60 to, say 25, the latter value being that of the voltage across the arc. The corresponding decrease of ampere-turns in the windings 12 from open-circuit to welding conditions, and the demagnetizing effect of the windings 15, produce a large decrease in the magnetic flux through the magnetic field structure of the generator, so that when welding, said structure is being operated at a point of its B–H characteristic much below saturation. Consequently, when welding, the magnetizing effect of the 30 watts supplied to the windings 11, i. e., the magnetic flux produced by the latter, is very much increased from open-circuit to welding conditions, with the result that said windings 11, when welding, provide a very large part of the generator voltage. In the example given, the 30 watts supplied to the windings 11 are such that said windings 11, when welding, provide about the same amount of voltage as provided, when welding, by the self-excited field windings 12.

Thus, it is seen that, whereas a single separately excited field would require a rectifying device of 330 watts capacity, which device would make the cost of the apparatus commercially prohibitive, the provision of the two fields 11 and 12 make possible a rectifying device of only 30 watts, this making the welding apparatus compact and elimination of harmful effects of undue inductive reaction between the separately excited field and bucking series field windings of the generator being effected with economy in cost of manufacture of the apparatus.

The apparatus described makes possible a large saving in the power required for proper excitation of the welding generator, particularly under welding conditions. In the example above given, when not welding, the voltage across the windings 12 is 60 volts, and, when welding, the voltage across said windings is that of the voltage across the arc, say 25 volts. When not welding, the current in the windings 12 is 300/60 or 5 amperes. When welding, the current in the windings 12 is 25/60 that of the current in said windings on open circuit; i. e., 5×(25/60) or approximately 2.1 amperes, and the power required for their excitation is then approximately 25×2.1 or 52 watts. Thus, when welding, with the power consumed by the separately excited field windings 11 still 30 watts, the total power required for proper excitation of the windings 11 and 12 is 30+52 or 82 watts, as compared to the 330 watts which would be required, when welding, for excitation of separately excited field windings if used alone, without self-excited field windings. The efficiency of a generator or exciter required to deliver 330 watts would not be greater than 50%, and the overall efficiency of such an exciter and motor driving same would not be greater than say 35%; consequently, under open-circuit or welding conditions, 330/.35 or approximately 940 watts would have to be provided to the motor driving the welding generator for proper excitation of its separately excited field windings if used alone and excited by a generator. The overall efficiency of a rectifier unit 34, supplying 30 watts to the separately excited field windings 11, and of a transformer 37, connected to the input of said rectifier, is approximately 50%. Therefore, on open-circuit, the power taken from the source 35 for proper excitation of the windings 11 is 30/.5—or 60 watts, and the power taken from the source 35 for excitation of the windings 12, with a motor and generator overall efficiency of, say 73%, is 300/.73 or 410 watts. Thus, on open-circuit the total power for excitation of the windings 11 and 12 is 60+410 or 470 watts as compared to the 940 watts to be provided if separately excited field windings were used alone and current supplied to such windings from a generator. When welding, the power taken from the source 35 for proper excitation of the windings 11 and 12 is only 60+52/.73 or 130 watts, as compared to the 940 watts to be provided if separately excited field windings 12 were used alone and current supplied to such windings from a generator.

From the above description, it becomes apparent that I have provided a welding apparatus employing a welding generator having separately excited and bucking series fields which apparatus is compact, small in cost of manufacture and efficient in that its operating losses are small and in that harmful effects of undue inductive reaction between the separately excited field windings and the bucking series field windings of the generator are absent.

What I claim is:

1. In a welding apparatus, a direct current welding generator having separately excited field windings and bucking series field windings; and means for supplying a unidirectional exciting current to said separately excited field windings comprising a source of current, and a rectifying device connected to said source and to said separately excited field windings, said rectifying device checking flow of current opposite to the normal flow of current in said separately excited field windings.

2. In a welding apparatus, a direct current welding generator having separately excited field windings, series field windings differentially wound with respect to said separately excited field windings, and additional field windings cumulatively wound with respect to said separately excited field windings and excited by the generator; and means for supplying a unidirectional exciting current to said separately excited field windings comprising a source of current, and a rectifying device connected to said source and to said separately excited field windings, said rectifying device checking flow of current opposite to the normal flow of current in said separately excited field windings.

3. In a welding apparatus, a direct current welding generator having separately excited field windings, series field windings differentially wound with respect to said separately excited field windings, and additional field windings cumulatively wound with respect to said separately excited field windings and excited by said generator; and means for supplying a unidirectional exciting current to said separately excited field windings comprising an alternating current source, a step-down transformer the primary of which is connected to said source, and a rectifier unit the input of which is connected to the secondary of said transformer and the output of which is connected to said separately excited field windings, said rectifying device checking flow of current opposite to the normal flow of current in said separately excited field windings.

In testimony whereof, I have affixed my signature to this specification.

ALEXANDER CHURCHWARD.